United States Patent
Kumar et al.

(10) Patent No.: US 12,277,034 B2
(45) Date of Patent: Apr. 15, 2025

(54) CONTENT AWARE DYNAMIC DATA POOL ALLOCATION

(71) Applicant: Dell Products L.P., Round Rock, TX (US)

(72) Inventors: Avinash Kumar, Patna (IN); Mahesh Reddy Av, Bangalore (IN); Terry O'Callaghan, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/353,429

(22) Filed: Jul. 17, 2023

(65) Prior Publication Data

US 2025/0028607 A1    Jan. 23, 2025

(51) Int. Cl.
*G06F 16/16* (2019.01)
*G06F 11/14* (2006.01)

(52) U.S. Cl.
CPC .......... *G06F 11/1464* (2013.01); *G06F 16/16* (2019.01); *G06F 2201/84* (2013.01)

(58) Field of Classification Search
CPC ... G06F 16/16; G06F 11/1464; G06F 2201/84
See application file for complete search history.

(56) References Cited

U.S. PATENT DOCUMENTS

| | | | |
|---|---|---|---|
| 11,966,359 B1 * | 4/2024 | Doshi | G06F 16/113 |
| 2020/0134198 A1 * | 4/2020 | Rudrabhatla | G06F 18/24 |
| 2022/0050828 A1 * | 2/2022 | Wu | H04L 41/042 |
| 2022/0058498 A1 * | 2/2022 | Rane | G06N 5/04 |
| 2022/0083431 A1 * | 3/2022 | Jia | G06F 11/3409 |
| 2022/0334719 A1 * | 10/2022 | Thrane | G06F 3/0608 |

* cited by examiner

*Primary Examiner* — Dangelino N Gortayo
(74) *Attorney, Agent, or Firm* — Staniford Tomita LLP

(57) ABSTRACT

A data protection system protects the data with the appropriate level of security and tiering for storage in data pools. The system includes a content awareness feature that is utilized to classify and analyze the data to be backed up and assigns the classified data to the appropriate data pool dynamically. It uses a classifying software development kit (SDK) or application program interface (API) to classify and analyze the contents. Based on this classification, data is segregated using specific data properties and is compared with a list of data pool properties. Then system then ranks and predicts the pool that is best suited for the classified data and dynamically assigns the data to the pool during backup.

20 Claims, 4 Drawing Sheets

CONTENT AWARE DYNAMIC DATA POOL ALLOCATION

TECHNICAL FIELD

Embodiments are generally directed to large-scale backup systems and more specifically to protecting data assets using content aware dynamic data pool allocation.

BACKGROUND

With ever increasing amounts of data and the need for scalability in enterprise level data systems, the data must be classified properly to be efficiently processed for protection and other purposes. Data is usually associated with its own set of properties and characteristics. Data classification can thus involve many attributes, such as type, availability, priority, confidentiality, sensitivity, frequency of usage, encryption, access control, applications, portability, conversion, and many other similar aspects. This generally poses a big challenge for any data protection system.

Present data protection software lacks sufficient content awareness of data. This requires the user or system administrator to classify the data themselves, select the appropriate processing or storage device for each data set, classify the protections policies accordingly, and then manually assign the static storage or "data pool" for storage of the data. This is a tedious process since the backup admin needs to deal with multiple data zones, multiple applications and workloads, large data change rates, and data with varying priorities and criticalities. Most data protection software requires data pools to be created and correctly associated with the appropriate policies. If a storage device goes bad or becomes full, the pool needs to be changed by the backup admin before the backup is triggered. This usually needs to be done during system downtime or in a static condition, as current data protection software does not allow for dynamic pool assignments to the policies.

What is needed, therefore, is a data protection system that analyzes and classifies backup data and dynamically assigns the classified data to the appropriate data pool.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF SUMMARY OF EMBODIMENTS

Embodiments are directed to a data protection system that protects the data with the appropriate level of security and tiering for storage in data pools. The system includes a content awareness feature that is utilized to classify and analyze the data to be backed up and assigns the classified data to the appropriate data pool dynamically. It uses a classifying software development kit (SDK) or application program interface (API) to classify and analyze the contents. Based on this classification, data is segregated using specific data properties and is compared with a list of data pool properties. Then system then ranks and predicts the pool that is best suited for the classified data and dynamically assigns the data to the pool during backup.

Embodiments are further directed to a data ranking model that compares the tagged properties of data assets and data pools received from a pool-data comparator. Based on the comparison, the data ranking model assigns a rank to each asset, indicating its suitability for storage in different data pools. The ranking is determined by evaluating the compatibility and matching of properties based on sets of respective attributes, such as data type, criticality, and so on for assets, and storage type, performance, and so on for data pools. Assets with higher priority, sensitivity, or specific requirements will be assigned to pools that offer corresponding characteristics. The ranking model helps predict and select the appropriate pool for each dataset based on their respective features (e.g., priority, data type, retention needs, and so on.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
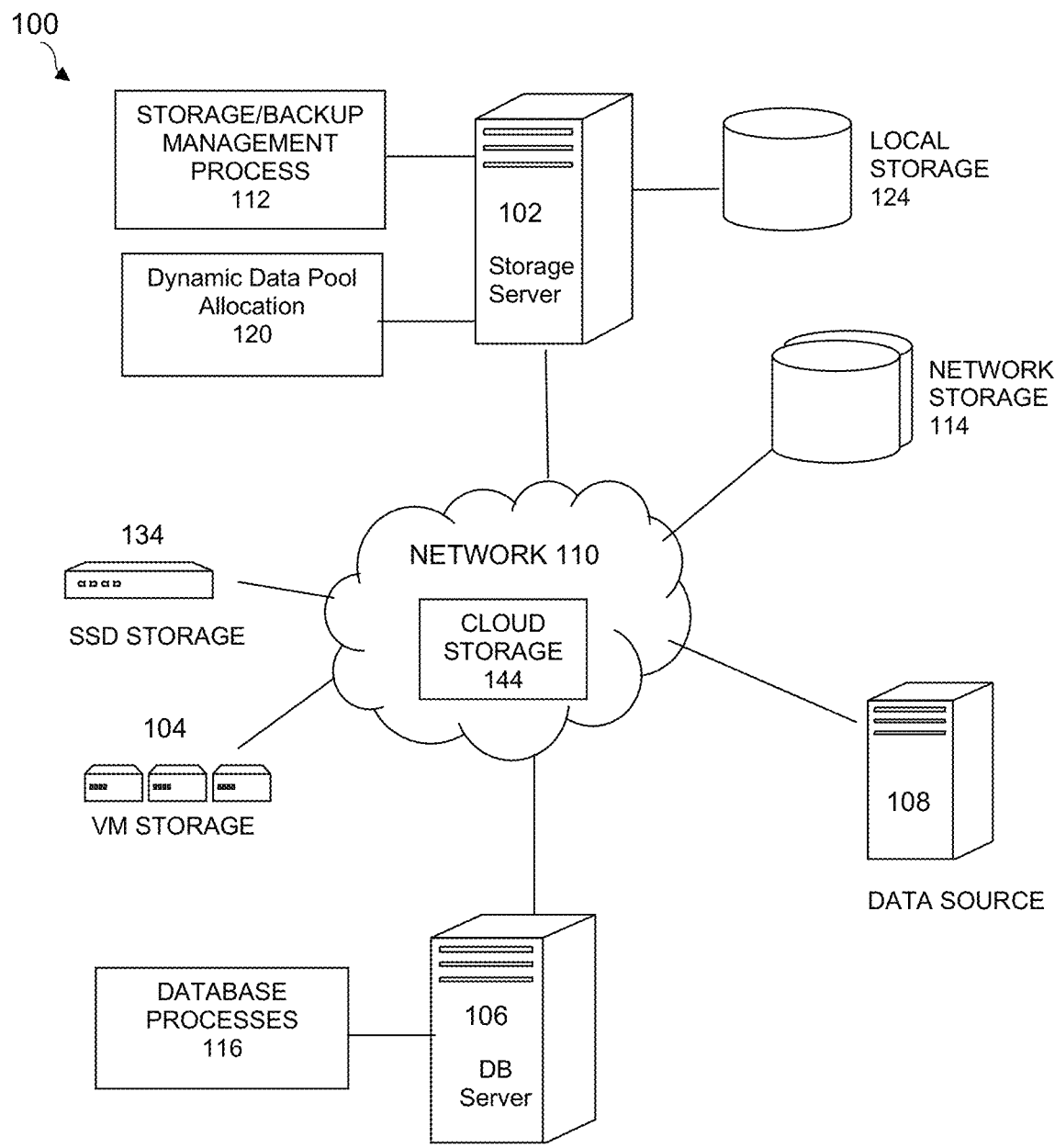
FIG. 1 illustrates a computer network system that implements one or more embodiments of a content aware dynamic data pool allocation system.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Data protection systems involve backing up data at regular intervals for restoration, replication, or data move operations based on user need and/or data corruption events. To reduce the sheer amount of data that is backed up and stored, such systems typically use some form of deduplication to eliminate redundant copies of data, such as might be present with data that is frequently backed up, but not as frequently changed in between each backup period.

The Data Domain File System (DDFS) is an example of one such deduplication file system. As the data is ingested, the filesystem anchors and segments the data. The filesystem keeps track of segments which are stored on the disk, and if the segments were to be seen again, the filesystem would just store the reference to the original data segment which was written to disk. Deduplication backups often involve periodic full backups of data from backup clients by the backup server followed by one or more incremental backups that backup only that data that has changed from a last full backup. Because of the sheer number of backup clients and the amount of data in a large scale data processing system, such backups can be very time and processor intensive.

In order to provide appropriate backup protection to users, data protection vendors often implement certain service level agreements (SLAs) and/or service level objectives (SLOs) to define and quantify certain minimum requirements with regard to backup performance. These parameters usually define characteristics such as maximum backup time per session, minimum data throughput rates, maximum data restore times, data storage terms, and so on. The vendor and/or user is allowed to define policies that control backup operations, such as backup schedules, identity and priority of backup clients and storage targets, backup data types, and so on, and such policies are usually written so that the SLA and SLO requirements are met. However, the dynamic and changing nature of different clients and data types in a backup dataset means that these policies must be similarly adaptable and dynamic to accommodate such changes.

Large-scale data processing and protection systems often provide different types of devices and media to store the data. Storage targets comprising specific types of devices are usually selected on the basis of cost relative to capacity and performance factors. For example, storage that is fast and local, such as solid state disks (SSD) is usually quite expensive in terms of device costs or vendor pricing and limited in capacity, though it provides the highest performance, i.e., fast backup/restore speeds, etc. Likewise, storage that is cheaper is usually slower and/or remotely located, such hard disk (HDD) or even tape storage for archive or legacy purposes. Cloud or virtual storage is also a common target and can comprise a mix of different physical storage devices. Not all data in a typical enterprise needs to be stored the same way, and given cost constraints, system administrators typically organize the different available storage devices into different pools or tiers of data, with tier 1 comprising fast/expensive storage reserved for critical or highly available data, tier 2 comprising slower/less expensive storage used for normal or routine data, tier 3 comprising yet slower and cheaper storage for legacy data, and so on. Any number of pools or tiers may be defined and used depending on the system size/configuration, applications, data types, and so on.

Backup datasets are usually assigned to the appropriate data pool through specific backup policies. As mentioned above, present systems require the user or administrator to manually and statically write policies or deliberately assign datasets to corresponding data pools. This is generally a time intensive process requiring administrator overhead, and more importantly, does not easily accommodate changing conditions, such as changes in data type, storage devices, or unavailability or failure of storage devices. To overcome these significant disadvantages, embodiments include a data protection process and component that includes a content awareness feature that is utilized to analyze and classify the backup dataset and dynamically assigns the classified data to the appropriate data pool upon execution of the backup operation. It uses a certain SDK/API-based classifiers to classify the contents. Based on this classification, data is segregated using specific data properties and is compared with a list of data pool properties. It then ranks and predicts the pool that is best suited for the classified data for dynamic assignment to the appropriate pool.

FIG. 1 illustrates a computer network system that implements one or more embodiments of a backup system using content aware dynamic data pool allocation. In system 100 of FIG. 1, a storage server 102 executes a data storage or backup management process 112 that coordinates or manages the backup of data from one or more data sources 108 to one or more storage devices. At least part of the network may comprise virtual machines (VMs) or groups of VMs (e.g., organized into virtual centers) such as VMs 104 that may serve as target storage devices. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The data may embody many different types of data generated by different applications and with different characteristics that impact optimal data protection policies. For example, some data maybe routine, while other data may be considered sensitive in that it is critical, confidential, or must be highly available for restoration in case of a data breach or system fault.

The network server computers are coupled directly or indirectly to the data storage 114, VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network. System 100 of FIG. 1 represents a system that includes a number of different storage sites and devices for use as targets by the storage server 102. The assignment of backup datasets to specific storage devices is typically accomplished by the use of policies that explicitly define data sources, backup periods, backup targets, retention times, and so on for each dataset processed in a backup operation.

In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, e.g., RAID (redundant array of individual disk) arrays. Other storage devices may include local storage 124 (typically resident disk drive or flash drive), VM storage 104, or SSD storage 134. Cloud storage 144 provided by an Internet Service Provider (ISP) is also a common type of storage target. Each different storage type provides different capacity levels and performance capabilities, and the cost associated with each storage type varies accordingly. For example, SSD 134 or local storage 124 is typically fast but low capacity and expensive, whereas network storage 114 or cloud storage 144 is typically cheap and reliable, but slow.

To effectively utilize the appropriate storage devices in the system, users must associate the backed up datasets to the right storage targets. This involves organizing the storage targets into different tiers (e.g., cost/performance tiers) and then assigning the datasets to these tiers through defined policies or backup commands. As shown in FIG. 1, system 100 includes a dynamic data pool allocation process 120 that automates this data to target assignment process based on data content using a classifier that analyzes the properties of the data and the targets (data pools).

Figure 2:
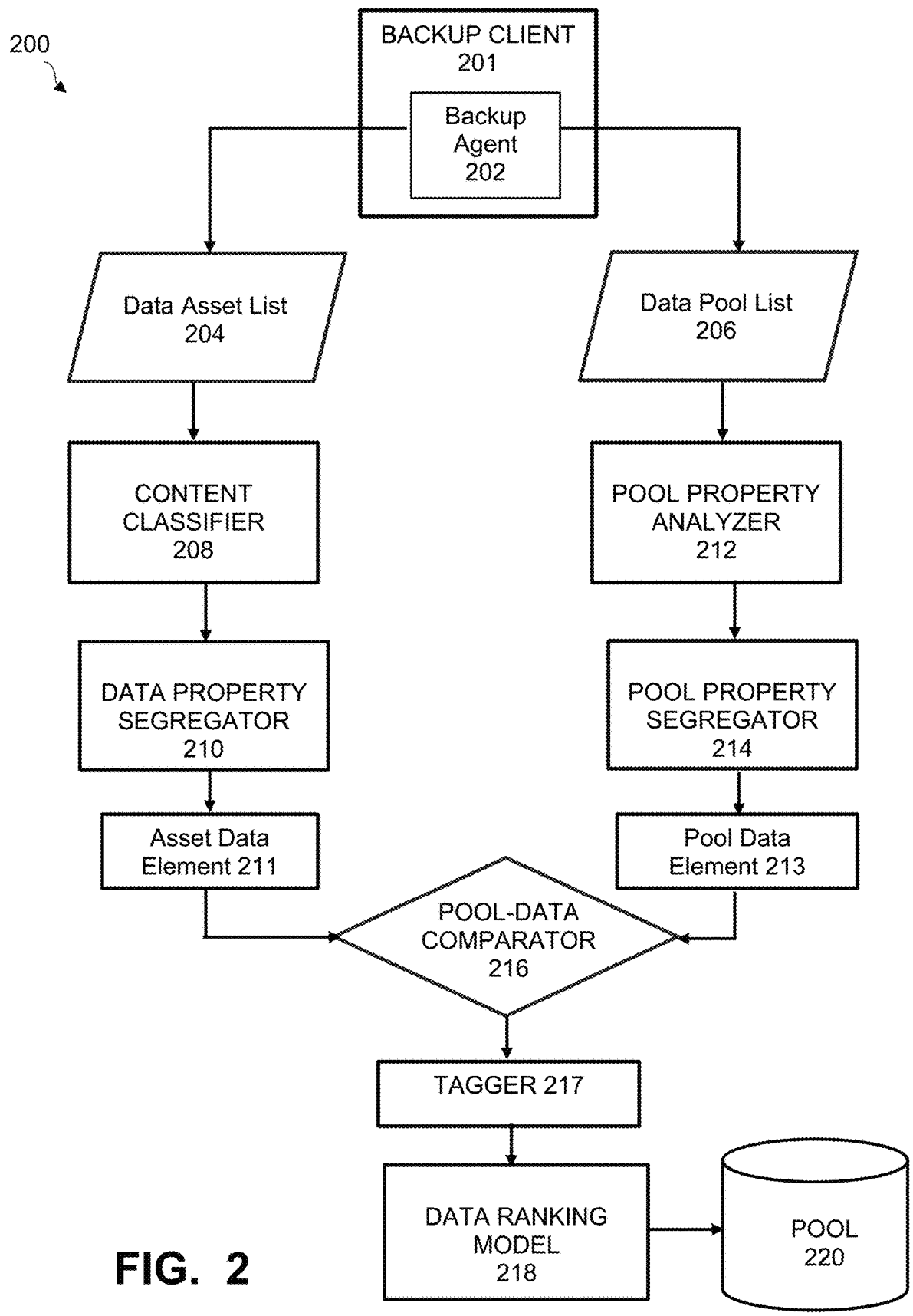
FIG. 2 is a block and flow diagram that illustrates components and processes implementing content aware dynamic pool allocation, under some embodiments.

FIG. 2 is a block and flow diagram that illustrates components and processes implementing content aware dynamic pool allocation, under some embodiments. System 200 illustrates processes by which component 120 provides the data protection process 112 with the to classify backup data based on its content and send it to the appropriate data pool.

In an embodiment, each backup client of system 100, such as data source 108 or database server 106 has an installed backup client that coordinates with the backup process 112 of backup server 102 to process the datasets to be backed up by the respective client.

As shown in FIG. 2, when a backup request is received by the backup agent 202 of backup client 201, it generates the list of assets 204 and list of the available data pools 206. The data asset list comprises a list of assets making up the backup datasets, such as files, databases, virtual machines, or any other data that needs to be protected. The list can be provided in any appropriate format for the file system (FS) or operating system (OS) such as file or data element names, directory locations, and so on.

The data list 204 is then sent to a content classifier 208. This component performs content analysis and classification using certain SDK/API processes that operate on the list of assets. In an embodiment, the SDK (software development kit) implementation uses a set of platform-specific building tools for a developer to build and run a classifier program as an installable package. The SDK can be implemented by one or more APIs (application programming interfaces) in the form of on-device libraries of reusable functions used to interface to a particular programming language, or it may be provided as hardware-specific tools that can communicate with a particular subsystem, or similar solution. In general, any existing classifier or user-developed classifier based on SDKs or APIs for content classification may be used.

In an embodiment, a natural language processor (NLP) based classifier can be implemented using SDKs or APIs that provide NLP functionalities for content analysis and classification. These SDKs or APIs offer pre-trained models, tools, and functions for performing NLP tasks. By utilizing such SDKs or APIs, the content classifying engine can incorporate NLP techniques for analyzing the textual content of the assets. For example, the content classifying engine can leverage an NLP SDK/API that includes features like text tokenization, sentiment analysis, keyword extraction, or topic modeling. The SDK/API provides a set of platform-specific tools or functions that enable developers to build and run the NLP classifier as an installable package. It may include pre-trained models or allow for fine-tuning on specific domains or datasets.

For this embodiment, the NLP-based classifier can process the textual content of the assets received from the data list, as mentioned in the write-up. It can extract relevant features using the NLP SDK/API, such as identifying keywords, sentiment scores, or topic distributions. Based on these extracted features, the classifier can make predictions about the nature or category of the assets. By combining the content classification results from the NLP-based classifier with other data property analysis and pool property comparison steps, system 200 can determine the best-suited device pool dynamically for each classified data set during the backup process.

The content classifier 208 classifies the data based on the content of the datasets and then provides the raw classified data to a data property segregator 210. This component 208 analyzes the contents of the data asset and segregates (bucketizes) the data in terms of its data protection needs. For example, confidentiality agreement documents typically consist of highly secure data where the frequency of the access is low. Consequently, these need to be stored in a secure device with encryption; likewise, financial transactions may be classified and tagged accordingly to take a higher priority compared with financial announcements, and so on.

Various properties associated with the asset are analyzed to establish the appropriate segregation 210. These properties represent certain characteristics, attributes or features of the data, and can include data criticality (sensitivity), confidentiality, frequency of access, access control (e.g., role-based access controls, RBAC), encryption, availability, application type, and many more parameters.

A tagger may be used to tag the segregated or bucketized data with an appropriate tag or label that is required to satisfy the backup request. The tag could be formatted to represent a specific factor or a combination of features. For example, an asset may be tagged as "CRITICAL," or "Encryption OK," "Restricted Access," and so on depending on the features. If standard combinations of data asset types are defined, the tag could be used to encode this characteristic, such as "Routine/Standard Data," "Archive Data," "Critical Data" and so on, where each characteristic is a combination of separate features.

Some example tags may include the following:
1. High Priority: This tag indicates that the asset has a high priority for backup and should be processed with urgency to ensure minimal downtime or data loss in case of an incident or problem.
2. Confidential: This tag signifies that the asset contains sensitive or confidential information that requires strict access controls and additional security measures during backup and storage.
3. Low Usage Frequency: This tag denotes that the asset is accessed infrequently, allowing for potential optimization strategies during backup, such as longer backup intervals or lower priority in terms of scheduling.
4. Large Data Size: This tag is used to identify assets with a large data size, indicating that they may require specific considerations for storage capacity or bandwidth during backup operations.
5. Compliance: This tag represents assets that are subject to regulatory compliance requirements and indicates that the data must be handled and backed up in accordance with specific regulations and retention policies.
6. Tier 1 Application: This tag identifies assets associated with critical or high-priority applications to ensures that the data from these applications receives specialized treatment during backup and restoration processes.

These tags are provided for purposes of example only, and other tags may also be used.

The features are used to select the appropriate data pool for storage of the asset. For example, database (e.g., SQL) transaction data with millions of transaction changes within a short span of time will need to be backed up to a large storage pool that is in the same data zone without any encryption since the data rate is high. This association of the data property characteristics to the device pool parameters is carried out for all the assets to build a data structure 211 that can be used to compare with the pool property data structure. This will be one of the inputs to the pool data comparator 214.

The data pool list 206 generated by the backup client 201 comprises a list of the available target storage devices in any appropriate format. Typical data pools include on-premises storage devices (e.g., NAS, SAN), cloud storage, HDD/Tape libraries, disk arrays with different performance characteristics (e.g., high-speed SSD, slower HDD), replicated storage for disaster recovery purposes, and so on.

This data pool list 206 from the backup agent 202 is then provided to a pool property analyzer 212. This component analyzes the pools with respect to attributes or features of the devices in each pool. The features for the pool property can be any or all relevant characteristics of storage devices, such as storage type (HDD, SSD, private cloud, public cloud, etc.), capacity, device IOPS (input/output operations per second), encryption level, bandwidth, speed, delay, location, and so on. A pool property segregator 214 can then be used to build a pool property data structure 213 that is used for comparison with asset property data structure 211 from data property segregator 210. A tagger process as described above can also be used to similarly tag the pools with appropriate labels or tags.

The pool property data structure 213 from the pool property analyzer and segregator and the asset property data structure 211 from the data property segregator are then provided to a pool data comparator 216. This component compares the asset properties with the pool properties and builds an association between the properties. Using the received data elements 211 and 213, the pool data comparator 216 identifies the common properties between the assets and pools on the basis of each relevant feature, such as criticality, availability, performance required/provided, and so on. This comparison allows the system to establish the relationships between the characteristics of the assets and the properties of the pools, which is then used to build a pool-asset association data element.

This associated data element that is then tagged by tagger 217 and sent to a pool-data ranking model, 218. As shown in FIG. 2, various operations involve tagging, such as tagging of data assets and data pools. One or more tagger components 217 may be used to tag the respective assets and/or pools with metadata labels encoding the appropriate feature value, such as a binary "critical" or "non-critical" tag, or a scalar value if a criticality scale is used, such as 0 (very critical) to 5 (non-critical), or similar scale. Any appropriate type and encoding of tags is possible depending on system configuration and applications.

The tagging process comprises assigning a text or alphanumeric label or tag to the segregated or bucketized data based on specific factors or combinations of features, and is performed by a tagger. The term "tagged" refers to the action of assigning a label or tag to the segregated or bucketized data. The data that is so tagged means that each data set has been marked or labeled with a specific identifier that represents its properties or characteristics. In an embodiment, the tagging process involves the steps of segregation of data, tag assignment, tag formatting, and tag encoding.

For the segregation or 'bucketization' of data, the data is first classified and segregated based on its properties and characteristics. This step involves analyzing various factors such as confidentiality, sensitivity, frequency of access, encryption requirements, and more. Once the data is segregated, the tagger component assigns an appropriate tag or label to each segregated data set. The tag represents a specific factor or a combination of features that characterize the data set. The tags are formatted in a way that represents the desired characteristics. The format can vary based on the system's requirements. For example, tags can be simple labels like "CRITICAL," "Encryption OK," or "Restricted Access." If standard combinations of data asset types are defined, the tags can be used to encode these characteristics. For instance, tags like "Routine/Standard Data," "Archive Data," or "Critical Data" can be used to represent specific combinations of separate features.

The purpose of tagging is to provide a convenient and meaningful representation of the properties and characteristics of the data sets. Tags help in organizing and managing the data more effectively, enabling the system to make informed decisions during the backup process. For example, tags can be used to determine the appropriate device pool for each data set based on its assigned tags. Overall, the tagging process assigns labels or tags to the segregated or bucketized data, representing specific characteristics or combinations of features that aid in the efficient management and backup of the data.

The model assigns a ranking to each asset indicating its suitability for different pools. Alternatively, the pools can be assigned a rank to determine suitability to store the asset, depending on the specific requirements and design of the system. For ranking assets, each asset is assigned a rank indicating its suitability for different pools. The rank represents the compatibility or preference of the asset to be stored in specific pools. The ranking can be based on factors such as the sensitivity of the data, priority, size, access frequency, or any other relevant criteria. The assets are then matched with the pools that are ranked accordingly, ensuring the best fit for each asset.

For ranking pools, the ranking can be assigned to the pools themselves, indicating their suitability for storing different types of assets. This approach involves evaluating the pools based on their capabilities, properties, and characteristics, and assigning them ranks accordingly. The rank values reflect how well each pool meets the requirements of various asset types. Assets are then allocated to the pools that have the appropriate rank, ensuring optimal storage based on their needs. This method allows for evaluating and comparing their capabilities, properties, and characteristics against the requirements of the assets, and the assets can then be allocated to the pool that best matches their needs.

Pools can be ranked along any appropriate scale, such as high, medium, low, or any other similar scale. In this example, a high rank indicates that the pool has excellent suitability for storing critical or highly sensitive assets, and may have features such as high security, encryption, redundancy, and fast access times. A medium rank suggests that the pool is suitable for storing assets with moderate requirements, and may have a good balance between security, performance, and storage capacity. A low rank signifies that the pool is suitable for storing assets with lower priority or less critical nature, as it may have fewer security measures or lower performance characteristics compared to higher-ranked pools.

Other characteristics may also be used to rank the pools, such as archive, cloud, specialized, high-performance, and the like. For example, archive ranking means that the pool is designed for long-term storage and archival purposes. These pools may have features optimized for data preservation, such as tape-based storage with high durability. Similarly, a cloud rank may be assigned to pools that utilize cloud storage services. The rank can vary based on factors like the type of cloud (private or public), encryption capabilities, performance, and cost. A specialized rank may be used for pools that have specialized features tailored to specific types of assets or applications. For example, a pool optimized for handling large multimedia files or databases could be assigned a specialized rank. Other descriptive rank values may also be used, such as high-performance, for smaller, more expensive memory (e.g., SSD) that can backup and restore data faster than other types of memory, and so on.

The rank values can be determined based on the characteristics and capabilities of the pools, taking into account factors such as security, performance, scalability, storage capacity, data protection mechanisms, and any other relevant attributes. The ranking system allows for efficient allocation of assets to the most suitable pool based on their requirements and priorities.

The pool-data ranking model 218 uses the compared tagged properties and assigns a relative rank for each asset and pool combination. This ranking is used in turn to predict or identify the appropriate pool 220 for each dataset. For example, Tag:Asset{CRITICAL} and Tag:Pool{High_Availability} would be ranked above Tag:Asset{CRITICAL} and Tag:Pool{Public_Cloud}. The pool-data ranking model plays a critical role in determining the suitability of each asset and pool combination. By utilizing the compared tagged properties, this model assigns a relative rank to each combination, providing valuable insights into their compatibility and optimal pairing. This ranking system serves as a decision-making tool for identifying the most appropriate pool for each dataset.

The pool-data ranking model evaluates the tags assigned to both the assets and the pools to determine their relative importance and compatibility. Each tag represents a specific characteristic or feature, such as the criticality of the asset or the availability level of the pool. Based on the compared tagged properties, the model assigns a rank to each combination, indicating its desirability for storage and backup purposes. For instance, consider the following example: Tag:Asset{CRITICAL} and Tag:Pool{High_Availability} would be ranked above Tag:Asset{CRITICAL} and Tag:Pool{Public_Cloud}. In this scenario, the model analyzes the criticality of the asset and determines that it is better suited for a pool with high availability. The ranking reflects the higher compatibility and suitability of this combination compared to the alternative pairing with a public cloud pool, which may have different characteristics and may not meet the required availability level.

The pool-data ranking model's output provides guidance for the selection of the appropriate pool for each dataset. It allows the system to make informed decisions during the backup process, ensuring that each asset is stored in a pool that aligns with its specific requirements and characteristics. By leveraging the ranked combinations, the system can predict and identify the most suitable pool for each dataset accurately. This predictive capability optimizes the backup process, enabling efficient data management and ensuring that assets are stored in the most appropriate pool based on their criticality, availability, or other relevant factors. Overall, the pool-data ranking model enhances the efficiency and effectiveness of the data protection system by assigning ranks to asset-pool combinations, facilitating the prediction of the ideal pool for each dataset based on their respective tags.

The examples provided above are for purpose of illustration only, and any appropriate tagging of assets and pools and combination pool-data sets may be used. For example, if the data comprises previous employee details that are tagged with low priority and/or tagged for archival purposes, this asset may be matched with a pool that is tagged for long-term storage, such as an offsite tape drive, and not with an expensive SSD storage device. In this case, the respective analyzers 208 and 212, will derive the appropriate features of the data and the pools, and the best matching pool as matched by comparator 216 will be selected (e.g., the pool with a tape drive that is used for long term retention).

System 200 performs the pool-data classification and comparison process each time a backup request is made, so that in the event of a change in data assets (e.g., a sudden tagging from non-confidential to confidential), or a change in data pools (e.g., a sudden failure of SSD media), new data and pool lists are generated and the analysis and matching processes can proceed on the fly.

Figure 3:
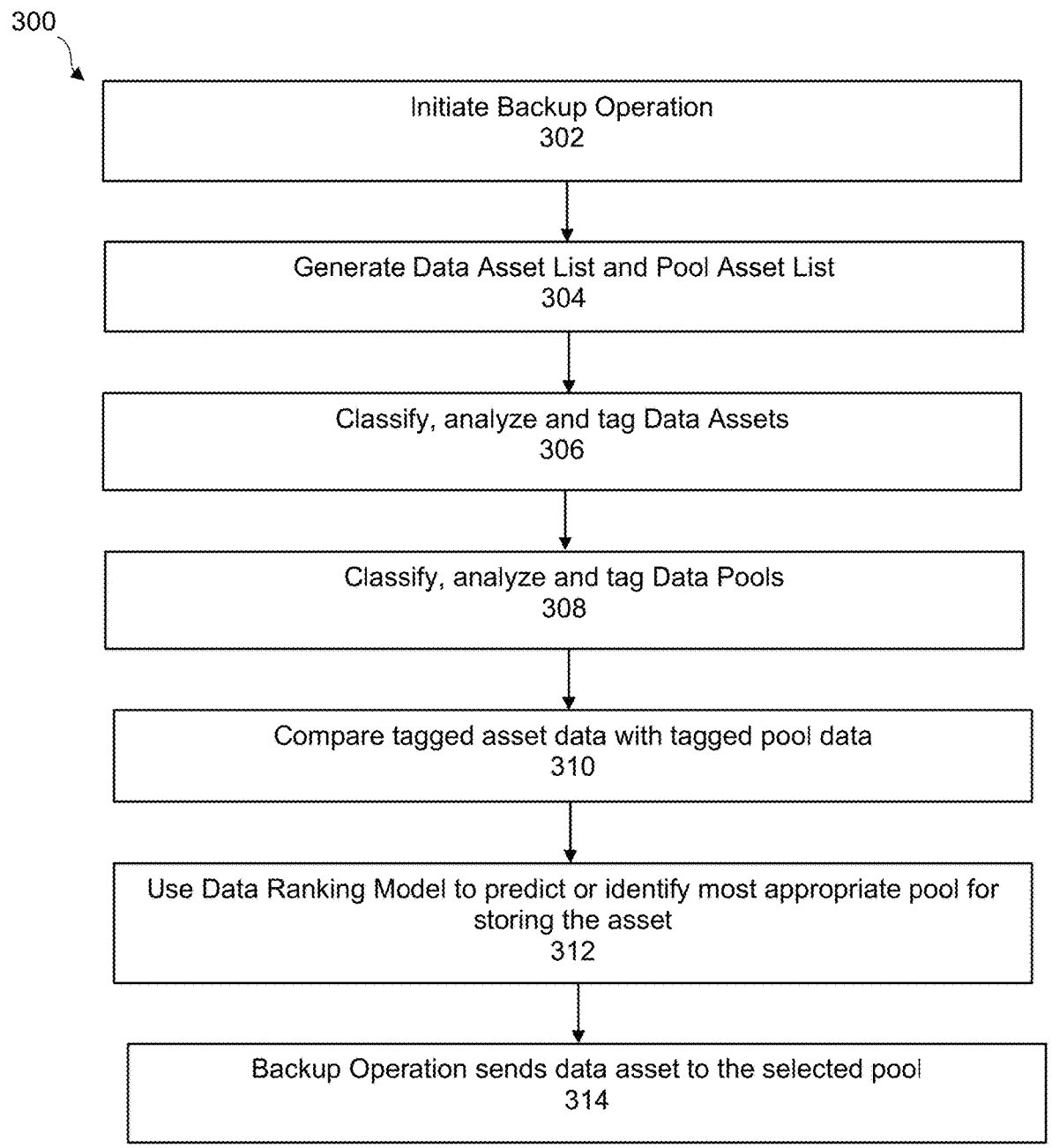
FIG. 3 is a flowchart that illustrates a method of dynamically allocating data pools using a content aware classifier, under some embodiments.

FIG. 3 is a flowchart that illustrates a method of dynamically allocating data pools for storage of data assets using content aware classification, under some embodiments. Process 300 begins with the initiation of a backup operation 302 by backup client 201. The client generates a data asset list and pool asset list, 304. In step 306, the data asset or assets in the data asset list are classified, analyzed, and tagged based on one or more defined data attributes or features, such as data type, criticality, priority, and so on. Likewise, in step 308, the data pools in the data pool list are classified, analyzed, and tagged based on one or more defined storage attributes or features, such as storage type, performance, availability, and so on.

A comparator is then used to compare the tagged asset data with the tagged pool data, 310. Based on the comparison, a data ranking model assigns a rank to each asset, indicating its suitability for storage in different data pools. The ranking is determined by evaluating the compatibility and matching of properties based on sets of respective attributes used in the respective analysis steps. The ranking model helps predict and identify the appropriate pool for asset based on their respective features (e.g., priority, data type, retention needs, and so on), 312. The backup operation then sends the data of the data asset to the device or devices of the selected pool, 314.

As shown in FIG. 3, process 300 compares the tagged asset data with the tagged pool data, followed by assigning a rank to each asset based on their suitability for storage in different data pools, is a logical approach. In this approach, the focus is on evaluating the compatibility and matching of properties between the assets and the pools. The comparison helps determine how well the attributes of the assets align with the properties of the pools. Based on this evaluation, a rank is assigned to each asset, indicating its suitability for storage in different pools.

As mentioned above, alternatively, the pools can be assigned a rank to determine their suitability to store an asset, so that assigning ranks to the assets or the pools can be done in either direction, depending on the specific requirements and design of the system. Assigning ranks to the assets allows for assessing their compatibility with different pools and finding the best match, whereas assigning ranks to the pools helps determine their suitability for storing different types of assets. This alternate way can be done by evaluating the pools based on their properties, capabilities, and characteristics, and assigning them ranks accordingly, and can be used depending on the configuration of the system.

The process 300 of FIG. 3 operates dynamically while the data protection system is in operation. It is starts upon the execution of a backup request to the backup agent 202, and automatically assesses and selects the most appropriate pool to store the data asset being backed up per the backup request. It thus avoids the need to stop the system or any backup threads in case policies or target assignments need to be updated, such as in the case of storage failure or datatype change. The process achieves this dynamic pool allocation using content classification and pool classification along with a comparator and ranking technique to tag the appropriate pool to the tagged asset. It enables data classification awareness based on content for the data protection software.

As mentioned above, any number of attributes (features) may be used to classify either or both of the data assets and the data pools. In an embodiment, system 200 of FIG. 2 may utilize certain metadata analysis processes to extract additional properties of the assets and/or pools. Such processes may be integrated with the respective classifier components 208 and 212, or they may be provided separately such as by any publicly available applications.

In an embodiment, system 200 of FIG. 2 may incorporate certain supervised learning technologies to improve the accuracy of the data and pool classification, over time. As used herein, "supervised learning" refers to a subcategory of machine learning (ML) and artificial intelligence (AI) that is defined by the use of labeled datasets to train algorithms that classify data elements or predict outcomes accurately. For this embodiment, certain AI/ML based classifiers may be used for one or both of the content and pool classification operations to classify assets and pools with respect to criticality, backup priority, and so on, within an overall data protection process.

As shown in FIG. 2, system 200 makes use of use of data ranking model. For the AI/ML embodiment, historical data from other systems, users, and environments may be used to train the model 218 to further inform the classification and ranking of pool-data combinations. The model used will make use of the all the existing parameters from the historical data from the past user environments to decide on the matching of assets to pools depending upon their respective features using the historical data. The historical data may be amassed from many years operation of deployed systems as well as theoretical or simulated data provided through laboratory simulations. It may also comprise current user configuration and deployment information including presently desired or used attributes and corresponding storage targets.

For this embodiment, the content aware dynamic data pool allocation system 300 utilizes certain artificial intelligence (AI) and machine learning (ML) processes to evaluate new data assets and data pools using various attributes to generate the model 218 and match an appropriate pool to a currently backed up asset. Such a process generally uses a training component that continuously trains a machine learning algorithm.

Figure 4:
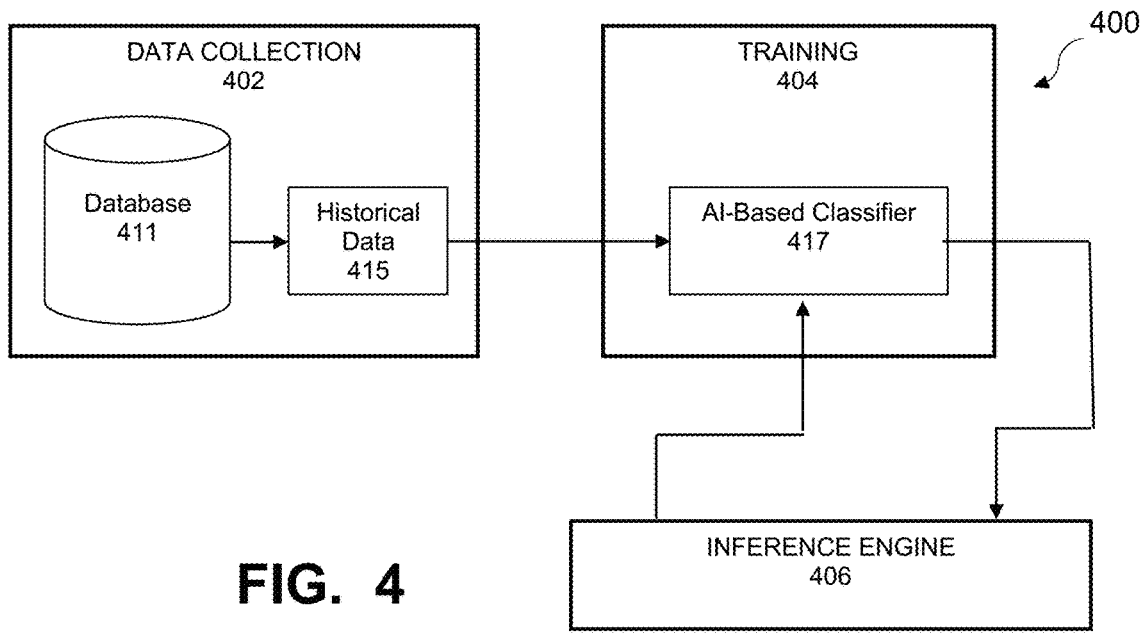
FIG. 4 illustrates a general AI/ML component used in a content aware pool-data allocation system, under some embodiments.

FIG. 4 illustrates a general AI/ML component used in a content aware pool-data allocation system, under some embodiments. System 400 of FIG. 4 includes a data collection component 402, a training component 404, and an inference component 406. The data collection component 402 can comprise various data loggers and I/O capture devices and databases 411 along with a body of historical information 415 about past data objects, clients, and events (e.g., backup operations). The data collection component 402 continuously monitors and collects data objects and event data to build up its database. This collected information is submitted to the training component 404 through an AI-based analyzer 417. This component continuously trains a machine learning algorithm to identify the data object attributes to thereby determine a relative backup priority of a new data object and/or client. The inference engine 406 also continuously trains the AI/ML algorithms through monitored events.

Figure 5:
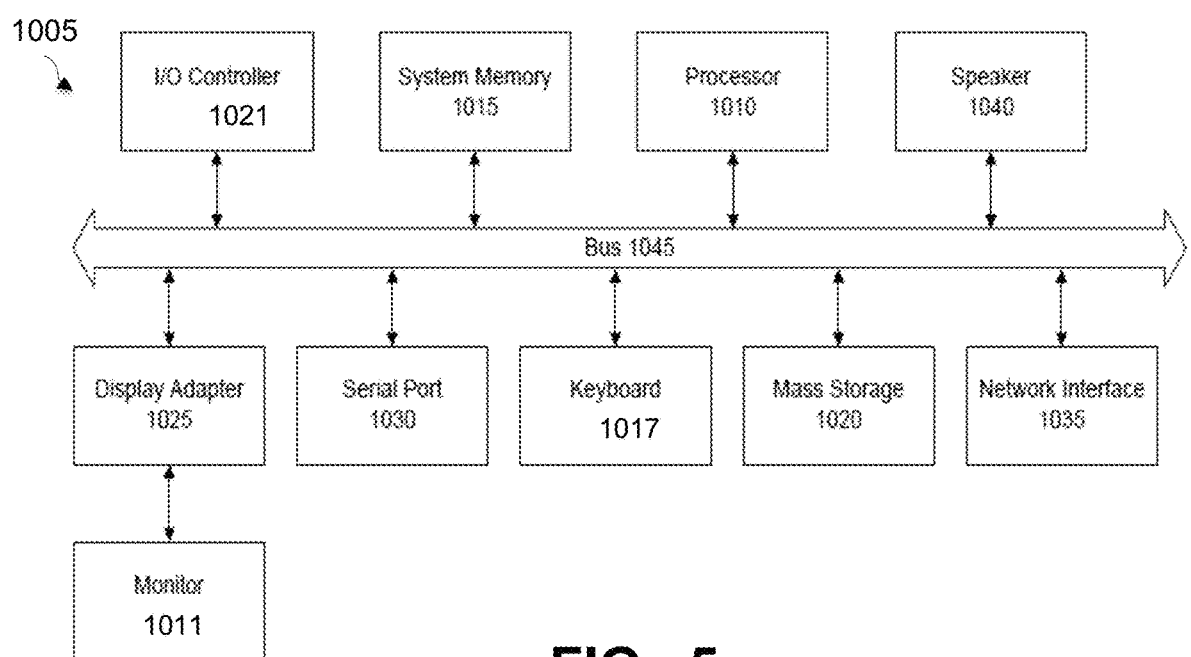
FIG. 5 shows a system block diagram of a computer system used to execute one or more software components of the present system described herein.

The system of FIG. 1 may comprise any number of computers or computing devices in client-server networks including virtual machines coupled over the Internet or similar large-scale network or portion thereof. Each processing device in the network may comprise a computing device capable of executing software code to perform the processing steps described herein. FIG. 5 is a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®, family of systems (e.g., Windows Server), Linux, Mac OS X, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11x), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of matching a data pool to a data asset backed up in data protection system, comprising:
    first generating an asset list listing an asset to be backed up;
    second generating a pool list listing a plurality of data pools available in the data protection system to store the asset;
    first classifying and analyzing the listed asset with respect to one or more data features to generate a respective classified asset data element;

first tagging the classified asset data element with a first tag encoding first features comprising at least data criticality, confidentiality, encryption, availability, and access control to generate a tagged asset data element;

second classifying and analyzing each listed pool with respect to one or more storage features to generate a respective classified pool data element;

second tagging the classified pool data element with a second tag encoding second features comprising at least storage type, criticality, capacity, availability, and performance to generate a tagged pool data element;

comparing the tagged asset data element to the tagged pool element to identify a pool appropriate to store the asset based on the respective data features and storage features based on a similarity match between the first tag and second tag;

assigning a relative rank to the compared tagged asset data element and tagged pool element relative to other compared and tagged asset data elements and pool elements; and selecting a pool having a highest relative rank for backup of the asset by the data protection system.

2. The method of claim 1 wherein the data asset comprises one of a virtual machine, a filesystem, a directory, a file, or a database, and the pool comprises storage devices selected from the group consisting of: a hard disk drive (HDD), a solid state drive (SSD), tape drive, public cloud storage, private cloud storage, and virtual machine (VM) storage.

3. The method of claim 2 wherein the data features are selected from a group consisting of: data type, criticality, confidentiality, priority, encryption, frequency of access, access control, and availability requirements.

4. The method of claim 2 wherein the storage features are selected from a group consisting of: device type, availability, performance, and location.

5. The method of claim 2 wherein the data and each pool is tagged with a respective tag encoding at least one feature of the respective feature or the respective storage feature.

6. The method of claim 5 wherein the respective tag is implemented as an alphanumeric metadata string associated with a corresponding asset or pool.

7. The method of claim 2 further comprising utilizing a data ranking model for the comparing step, and wherein the data ranking model assigns a rank to each asset indicating its suitability for storage in each pool of the plurality of pools.

8. The method of claim 7 further comprising training the model using historical data of data assets and storage for the data protection system or other data protection systems including a present and past users and laboratory environments to establish suitability of pools to different assets.

9. The method of claim 6 wherein the training utilizes an artificial intelligence (AI) based component comprising a data collection component, a training component, and an inference component, and contains historical information regarding data assets and pools to continuously train a machine learning (ML) algorithm to identify suitable pools for storage of specific types of data assets.

10. The method of claim 1 wherein the first generating and second generating steps occur upon initiation of a backup operation by the data protection system to back up the data asset, and wherein the selecting step executes dynamically without requiring suspension of the backup operation to match an optimal pool for storage of the asset.

11. The method of claim 10 wherein the data protection system comprises a deduplication backup system implementing a Data Domain file system (DDFS).

12. A system for matching a data pool to a data asset backed up in data protection system, comprising:

a backup agent first generating an asset list listing an asset to be backed up, and second generating a pool list listing a plurality of data pools available in the data protection system to store the asset;

a first classifier component classifying and analyzing the listed asset with respect to one or more data features to generate a respective classified asset data element and tagging the classified asset data element with a first tag encoding first features comprising at least data criticality, confidentiality, encryption, availability, and access control to generate a tagged asset data element;

a second classifier component classifying and analyzing each listed pool with respect to one or more storage features to generate a respective classified pool data element and tagging the classified pool data element with a second tag encoding second features comprising at least storage type, criticality, capacity, availability, and performance to generate a tagged pool data element;

a comparator comparing the tagged asset data element to the tagged pool element to identify a pool appropriate to store the asset based on the respective data features and storage features based on a similarity match between the first tag and second tag; and a data ranking component assigning a relative rank to the compared tagged asset data element and tagged pool element relative to other compared and tagged asset data elements and pool elements, and selecting a pool having a highest relative rank for backup of the asset by the data protection system.

13. The system of claim 12 wherein the data asset comprises one of a virtual machine, a filesystem, a directory, a file, or a database, and the pool comprises storage devices selected from the group consisting of: a hard disk drive (HDD), a solid state drive (SSD), tape drive, public cloud storage, private cloud storage, and virtual machine (VM) storage.

14. The system of claim 13 wherein the data features are selected from a group consisting of: data type, criticality, confidentiality, priority, encryption, frequency of access, access control, and availability requirements, and further wherein the storage features are selected from a group consisting of: device type, availability, performance, and location.

15. The system of claim 12 further comprising a tagger tagging the data and each pool with a respective tag encoding at least one feature of the respective feature or the respective storage feature, and wherein the respective tag is implemented as an alphanumeric metadata string associated with a corresponding asset or pool.

16. The system of claim 12 wherein the data ranking component utilizes a data ranking model for the comparator, and wherein the data ranking model assigns a rank to each asset indicating its suitability for storage in each pool of the plurality of pools.

17. The system of claim 16 further an artificial intelligence (AI) based component comprising a data collection component, a training component, and an inference component, to train the model using historical data of data assets and storage for the data protection system or other data protection systems including a present and past users and laboratory environments to establish suitability of pools to different assets.

18. The system of claim 12 wherein the backup agent operates upon initiation of a backup operation by the data protection system to back up the data asset, and wherein the selecting is performed by the data ranking component dynamically without requiring suspension of the backup operation to match an optimal pool for storage of the asset.

19. The system of claim 18 wherein the data protection system comprises a deduplication backup system implementing a Data Domain file system (DDFS).

20. A tangible computer program product having stored thereon program instructions that, when executed by a process, cause the processor to perform a method matching a data pool to a data asset backed up in data protection system, comprising:

first generating an asset list listing an asset to be backed up;

second generating a pool list listing a plurality of data pools available in the data protection system to store the asset;

first classifying and analyzing the listed asset with respect to one or more data features to generate a respective classified asset data element;

first tagging the classified asset data element with a first tag encoding first features comprising at least data criticality, confidentiality, encryption, availability, and access control to generate a tagged asset data element;

second classifying and analyzing each listed pool with respect to one or more storage features to generate a respective classified pool data element;

second tagging the classified pool data element with a second tag encoding second features comprising at least storage type, criticality, capacity, availability, and performance to generate a tagged pool data element;

comparing the tagged asset data element to the tagged pool element to identify a pool appropriate to store the asset based on the respective data features and storage features based on a similarity match between the first tag and second tag;

assigning a relative rank to the compared tagged asset data element and tagged pool element relative to other compared and tagged asset data elements and pool elements; and selecting a pool having a highest relative rank for backup of the asset by the data protection system.

* * * * *